(12) United States Patent
Ronen et al.

(10) Patent No.: US 10,798,626 B2
(45) Date of Patent: Oct. 6, 2020

(54) METHOD OF MANAGING A CELLULAR NETWORK AND SYSTEM THEREOF

(71) Applicant: Cellwize Wireless Technologies Ltd., Ramat-Gan (IL)

(72) Inventors: David Ronen, Kfar Saba (IL); Gal Izhaki, Haifa (IL); Dan Weil, Tel Aviv (IL)

(73) Assignee: Cellwize Wireless Technologies Ltd., Ramat-Gan (IL)

(*) Notice: Subject to any disclaimer, the term of this patent is extended or adjusted under 35 U.S.C. 154(b) by 0 days.

(21) Appl. No.: 16/281,426

(22) Filed: Feb. 21, 2019

(65) Prior Publication Data

US 2019/0289514 A1 Sep. 19, 2019

Related U.S. Application Data

(60) Provisional application No. 62/633,196, filed on Feb. 21, 2018.

(51) Int. Cl.
*H04W 36/06* (2009.01)
*H04W 72/04* (2009.01)
(Continued)

(52) U.S. Cl.
CPC .............. *H04W 36/06* (2013.01); *H01Q 3/08* (2013.01); *H04B 17/327* (2015.01);
(Continued)

(58) Field of Classification Search
CPC .............. H04W 36/06; H04W 72/0453; H04W 28/0236; H04W 36/165; H04W 28/021;
(Continued)

(56) References Cited

U.S. PATENT DOCUMENTS

2016/0044518 A1* 2/2016 Centonza .............. H04W 24/08
370/328
2016/0066330 A1* 3/2016 Centonza ............ H04W 72/046
370/329
(Continued)

*Primary Examiner* — Andrew Lai
*Assistant Examiner* — Harry H Kim
(74) *Attorney, Agent, or Firm* — Wiggin and Dana LLP; Gregory S. Rosenblatt; Rikesh S. Patel

(57) ABSTRACT

There are provided a method and system of controlling traffic in a cellular network comprising at least one site characterized by a plurality of cells sharing a common antenna and operating in different frequencies. The method comprises processing performance-related data and network topology-related to obtain, for each cell of the plurality of cells, a performance score, thus giving rise to a set of frequency-dependent scores associated with the shared antenna; and enabling provisioning of the shared antenna in accordance with the set of frequency-dependent scores associated with the shared antenna. When no leading frequency is configured for the shared antenna, the provisioning is enabled merely when each score in the set of frequency-dependent scores meets respective adjustment criteria; and when a frequency among the different frequencies is configured as a leading frequency, the provisioning is enabled merely when a score corresponding to the leading frequency meets an adjustment criterion for the leading frequency.

18 Claims, 8 Drawing Sheets

(51) Int. Cl.
*H04W 28/02* (2009.01)
*H04W 36/16* (2009.01)
*H04B 17/327* (2015.01)
*H04B 17/382* (2015.01)
*H01Q 3/08* (2006.01)

(52) U.S. Cl.
CPC ...... *H04B 17/382* (2015.01); *H04W 28/0236* (2013.01); *H04W 36/165* (2013.01); *H04W 72/0453* (2013.01)

(58) Field of Classification Search
CPC ... H04W 24/02; H04B 17/327; H04B 17/382; H01Q 3/08
See application file for complete search history.

(56) References Cited

U.S. PATENT DOCUMENTS

2018/0248604 A1\* 8/2018 Zhang ................ H04B 7/08
2019/0208438 A1\* 7/2019 Yang ................ H04L 43/16
2019/0261197 A1\* 8/2019 Bellannkonda ....... H04W 24/04

\* cited by examiner

METHOD OF MANAGING A CELLULAR NETWORK AND SYSTEM THEREOF

TECHNICAL FIELD

The presently disclosed subject matter relates generally to systems and methods of cellular communication and, in particular, to systems and methods of managing a cellular network.

BACKGROUND

For today's complicated cellular networks, Self Organizing Network (SON) capabilities become essential in order to manage the network so to configure, organize, optimize performance and/or provide self-healing if/when faults occur. SON technology enables optimization of network performance and significant improvements in terms of capital expenditure (CAPEX) and operational expenditure (OPEX). Optionally, self-optimization functions can be aggregated into use cases (e.g. mobility load balancing (MLB), coverage and capacity optimization (CCO), and mobility robustness optimization (MRO)), which may be independent or may interact since they can operate on common control parameters.

Nowadays, the world of cellular communication is characterized by simultaneous deployment of multiple Radio Access Technologies (RATs) and multiple frequencies of the same RATs provided in a given coverage area by one or by multiple operators. Such heterogeneous cellular communication environment can result from implementing emerging new cellular communication standards whilst retaining legacy technologies for as long as possible. Such environment can be also caused by fragmented spectrum received for a given RAT by a given operator due to licensing issues, due to the evolving concept of delivering network infrastructure as a service (NaaS) and due to other reasons.

Consequently, mobile operators face a growing need to optimize capacity and coverage of heterogeneous radio access resources by constantly monitoring actual performance metrics for radio access network (RAN) and adjusting antenna parameters (e.g. by remote azimuth steering/horizontal (RAS) and/or by remote electrical tilt/vertical adjustment (RET) and/or by adjusting Remote Azimuth Beam-width (RAB)) accordingly.

GENERAL DESCRIPTION

In accordance with certain aspects of the presently disclosed subject matter, there is provided a method of managing a cellular network comprising at least one site characterized by a plurality of cells sharing a common antenna and operating in different frequencies. The method comprises: continuously obtaining by a computerized system performance-related data with regard to each cell of the plurality of cells and network topology-related data indicative, at least, of location and azimuth of the shared antenna; processing, by the computerized system, the obtained performance-related data and network topology-related data to obtain, for each cell of the plurality of cells, a performance score, thus giving rise to a set of frequency-dependent scores associated with the shared antenna; and enabling, by the computerized system, provisioning of the shared antenna in accordance with the set of frequency-dependent scores associated with the shared antenna. When no leading frequency is configured for the shared antenna, the provisioning is enabled merely when each score in the set of frequency-dependent scores meets respective adjustment criteria; and when a frequency among the different frequencies is configured as a leading frequency, the provisioning is enabled merely when a score corresponding to the leading frequency meets an adjustment criterion for the leading frequency.

By way of non-limiting examples:

a performance score of a given cell can be calculated as a value of a weighted combination of one or more KPIs depending on parameters of the shared antenna and characterizing the given cell, and wherein the adjustment criterion is met when the calculated value is less than a threshold;

a performance score of a given cell can be calculated as a set of values of KPIs depending on parameters of the shared antenna and characterizing the given cell, and wherein the adjustment criterion is met when at least one of the values is less than a threshold;

a performance score of a given cell can be calculated as a value corresponding to at least one sub-score selected from the group comprising a sub-score resulting from target distance analyses for the given cell, a sub-score resulting from measurements of PUSCH RSSI levels related to the given cell and a sub-score resulting from amount of total handover attempts in the given cell;

a performance score of a given cell can be calculated as a value corresponding to a combination of at least two independent sub-scores selected from the group comprising a sub-score resulting from target distance analyses for the given cell, a sub-score resulting from measurements of PUSCH RSSI levels related to the given cell, and a sub-score resulting from amount of total handover attempts in the given cell.

The performance score of a given cell can be indicative of a discrepancy between a coverage area corresponding to the obtained performance-related data and a coverage area corresponding to the obtained network topology-related data.

In accordance with further aspects of the presently disclosed subject matter, in the absence of a leading frequency, the provisioning can be enabled in accordance with the minimal adjustment of adjustments that are required for each one of the frequencies.

In accordance with further aspects of the presently disclosed subject matter, provisioning of the shared antenna can comprise at least one of adjusting remote azimuth steering/horizontal (RAS), adjusting remote electrical tilt/vertical adjustment (RET) and adjusting Remote Azimuth Beam-width (RAB).

In accordance with other aspects of the presently disclosed subject matter, there is provided a system usable for managing a cellular network comprising at least one site characterized by a plurality of cells sharing a common antenna and operating in different frequencies, the system configured to operate in accordance with the operations above.

In accordance with other aspects of the presently disclosed subject matter, there is provided a non-transitory computer readable medium comprising instructions that, when executed by a computer, cause the computer to perform the operations above.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "classifying", "calculating", "generating", "obtaining", "provisioning" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the traffic control system disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Figure 1A:
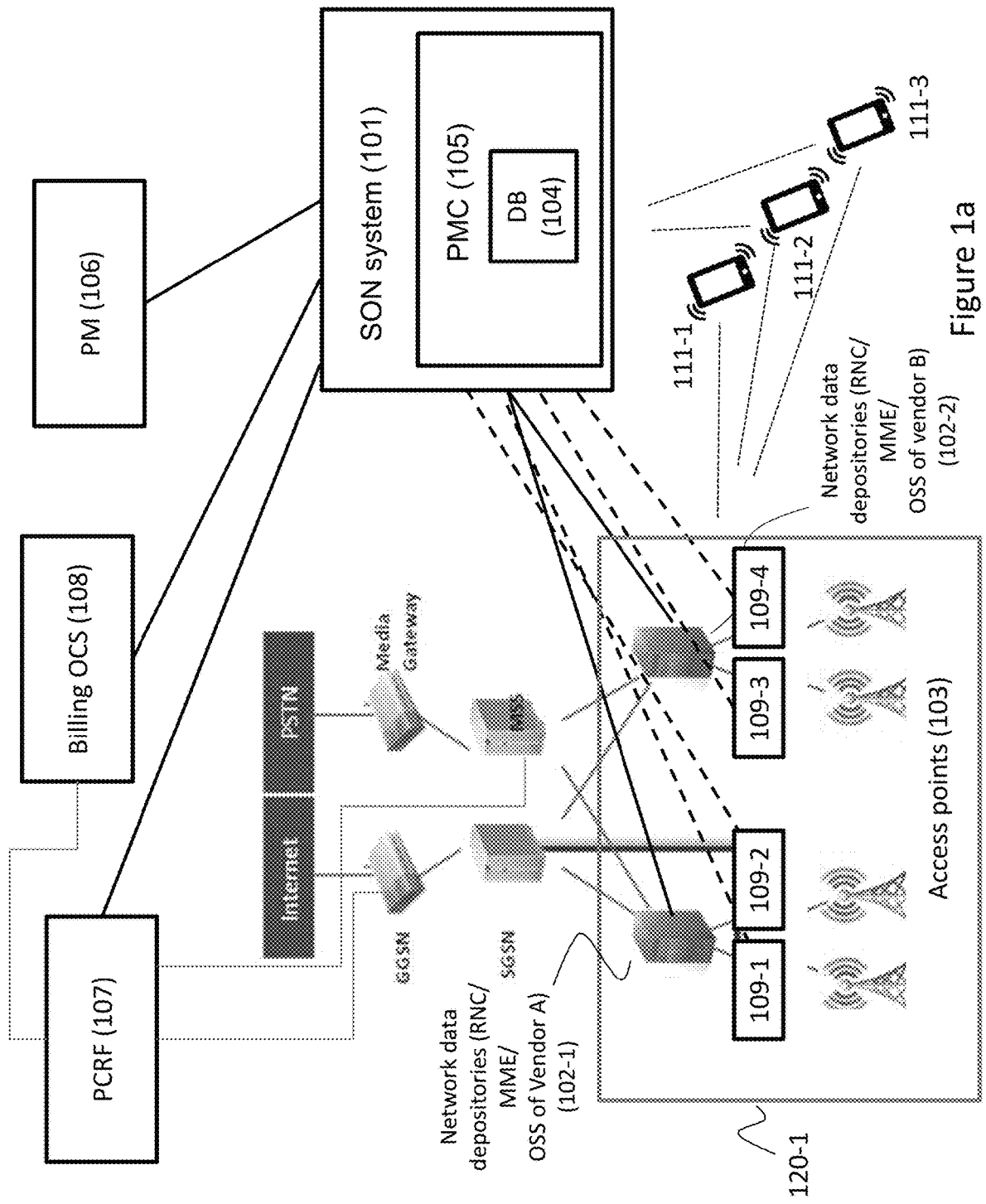
FIGS. 1a-1b illustrate exemplified generalized cellular network environments including a SON system configured in accordance with certain embodiments of the presently disclosed subject matter.
Figure 1B:
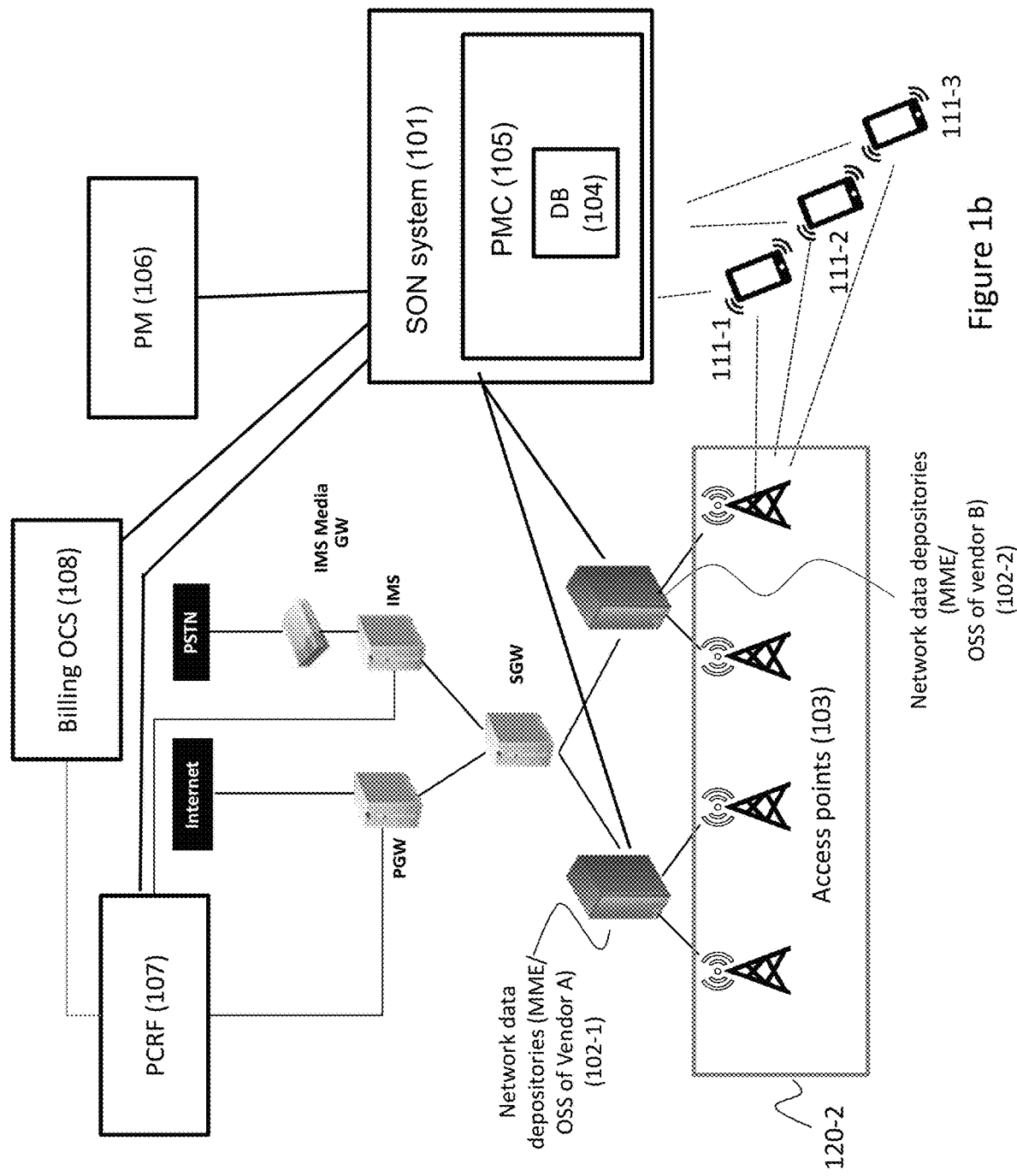

Bearing this in mind, attention is drawn to FIG. 1a and FIG. 1b illustrating a non-limiting example of a schematic cellular network environment including a system capable of controlling traffic in accordance with certain embodiments of the presently disclosed subject matter and referred to hereinafter as a SON system.

FIG. 1a illustrates a generalized 3G cellular network environment, and FIG. 1b illustrates a generalized environment of LTE or 5G cellular networks. The exemplified network environments illustrated in FIGS. 1a and 1b comprise a radio access network (RAN) denoted 120-1 for 3G network in FIG. 1a and 120-2 for LTE network in FIG. 1b. RAN comprises a plurality of access points (e.g. macrocells, picocells, femtocells base stations, eNBs, etc. and/or groups thereof) denoted as 103-1-103-4. The access points can operate in different bands and/or RATs (Radio Access Technologies) and can be provided by different vendors. The access points (APs) serve a multiplicity of user equipment devices (UEs) being in operating or in idle modes. The UEs are configured to communicate with APs via radio frequency (RF) channels allowing bidirectional transmission of voice and/or data between the APs and UEs in accordance with respective cellular standards.

SON system 101 is configured to collect and process data related to the cellular network and to enable, accordingly, corrective actions (e.g. self-configuring, self-optimizing and/or self-healing, etc.) with regard to one or more access points.

SON system 101 can be connected to access points 103 by direct connection or through a mediation layer as, for example, OSS server (connections not shown for simplicity of illustration). SON system 101 is operatively connected to one or more network depositories denoted as 102-1 and 102-2. Optionally, some of the network depositories can be provided by different vendors. Unless specifically stated otherwise, any depository of data received from the plurality of APs (directly, via probe devices and/or otherwise) is referred to hereinafter as a network data (ND) depository. By way of non-limiting example, in a 3G environment such depositories can be located at Radio Network Controller(s) (RNC), OSS (Operation and Support System) servers, etc. By way of another non-limiting example, in LTE environment such depositories can be located at OSS servers and/or at Mobile Management Entities (MME). The SON system can be further operatively connected to a Performance Management (PM) node (106) and, optionally, to a Policy and Charging Rules Function (PCRF) node (107), billing system (108) and/or other client-related system.

SON system 101 comprises a processor and memory circuitry (PMC) 105 configured to enable operations as detailed with reference to FIGS. 2-6. PMC 105 comprises a processor (not shown separately) operatively coupled to a memory (not shown separately). PMC 105 can further accommodate a database 104 configured to store the collected data and the results of processing thereof.

SON system 101 can be configured to continuously collect RAN-related data from one or more ND depositories.

Optionally, SON system 101 can derive RAN-related data from various data records (e.g. xDR, where x stands for Call/Transaction/Session) collected from ND depositories and informative of network performance and/or resource utilization.

Alternatively or additionally, the SON system can continuously receive KPIs and/or other performance-related data (including data related to resource utilization and UE distribution) from different depositories (e.g. from the PM node 106).

Alternatively or additionally to receiving data collected in one or more network depositories, the SON system can be configured to continuously obtain RAN-related data from a plurality of probe devices. The probe devices are denoted as 109-1-109-4 in FIG. 1a (and are not shown in FIG. 1b for simplicity of illustration). The probe devices are operatively connected to the respective access points to sniff and/or monitor traffic (e.g. between the access points and the RNC or between the access points and the MME). The SON system can receive data directly through the probe devices (e.g. as illustrated for the probe devices 109-3 and 109-4) or via network depositories (e.g. as illustrated for the probe devices 109-1 and 109-2). Optionally, SON system 101 can continuously receive data collected by the probe devices in near real-time mode, independently of collection periods of the network depositories.

Alternatively or additionally, SON system 101 can be further configured to operatively communicate with a plurality of UEs (denoted as 111-1-111-3) and to continuously collect data therefrom. UEs 111 can be configured to continuously report to SON system 101 data informative, at least, of RAN-related measurements provided by respective UEs in accordance with respective cellular standards.

RAN-related measurements can be related to (and associated with) a serving AP and one or more surrounding APs (not necessarily included in a neighbouring list of the serving cell) and/or locations associated therewith. For example, RAN-related measurements can include RRC measurements provided by UEs for RRC (Radio Resource Control) measurement reports in accordance with 3G or higher standards. By way of non-limiting example, data informative of RAN-related measurements can include RSRP, RSRQ, RSSI, CQI, data throughput, latency, packet loss, etc. Alternatively or additionally, RAN-related measurements can include measurements which are not included in RRC reporting (e.g. call-drop indications, reasons the calls were dropped, etc.) Further to data informative of RAN-related measurements, UE 111 can be configured to continuously report, and SON system 101 can be configured to continuously collect data informative of UE location and, optionally, of other context-related data (and/or derivatives thereof) obtained using various sensors of the UE (e.g. gyroscope, accelerometer, GPS, etc.) and/or applications running on the UE. By way of non-limiting example, context-related data can include battery level threshold, battery charge rate of change, predicted location of UE based on UE mobility and/or UE calendar information, calendar information, alarm information, application data from an application running on the UE, type of UE (e.g. smartphone, IoT item, etc.), name of mobile operator, environment-related status (e.g. indoor, outdoor, driving, walking, etc.), etc. Optionally, UE 111 can be configured to process at least part of the data informative of RAN-related measurements and/or context-related data, and to send the respective derivatives to SON system 101.

Further to obtaining RAN-related data, SON system is configured to obtain data informative of a planned network topology, including geolocation and configuration of access points. Such data can be obtained from the ND depositories (e.g. one or more OSSs, Network Planning System (e.g. ATOLL™), etc.) or from another source(s).

RAN-related data, derivatives thereof and data informative of network topology are referred to hereinafter as network (NW) data. It is noted that RAN-related data are collected in association with data indicative of respective APs. KPIs corresponding to NW data and respective association thereof are referred to hereinafter as network KPIs. Such KPIs can be received by SON system 101 from network entities (e.g. PM node 106) and/or obtained by processing the collected NW data. SON system 101 can be configured to store the obtained NW data and/or NW KPIs in the database 104.

NW data and network KPIs can be informative of network performance (including resource utilization and UEs' distribution). By way of non-limiting example, NW data can be informative of Reference Signal Received Power (RSRP), Reference Signal Received Quality (RSRQ), Received Signal Strength Indication (RSSI), Signal-Noise Ratio (SNR), Channel Quality Indicator (CQI), Timing Advance (TA), etc. Network KPIs can be informative of Handover Success Rate, Dropped Call Rate (DCR), throughput, network accessibility, and other network performance aspects.

Thus, in accordance with certain embodiments of the presently disclosed subject matter and as will be further detailed with reference to FIGS. 2-6, the SON system can be configured to process the obtained performance and topology related data and dynamically recommend and/or provide, directly or indirectly, corrective actions with regard to one or more access points in accordance with the monitoring results.

Those versed in the art will readily appreciate that the teachings of the presently disclosed subject matter are not bound by the network environments illustrated in FIGS. 1*a* and 1*b*, and can be implemented in other network architectures and/or standards. The SON system can be a standalone network entity, or integrated, fully or partly, with other network entities.

Figure 2:
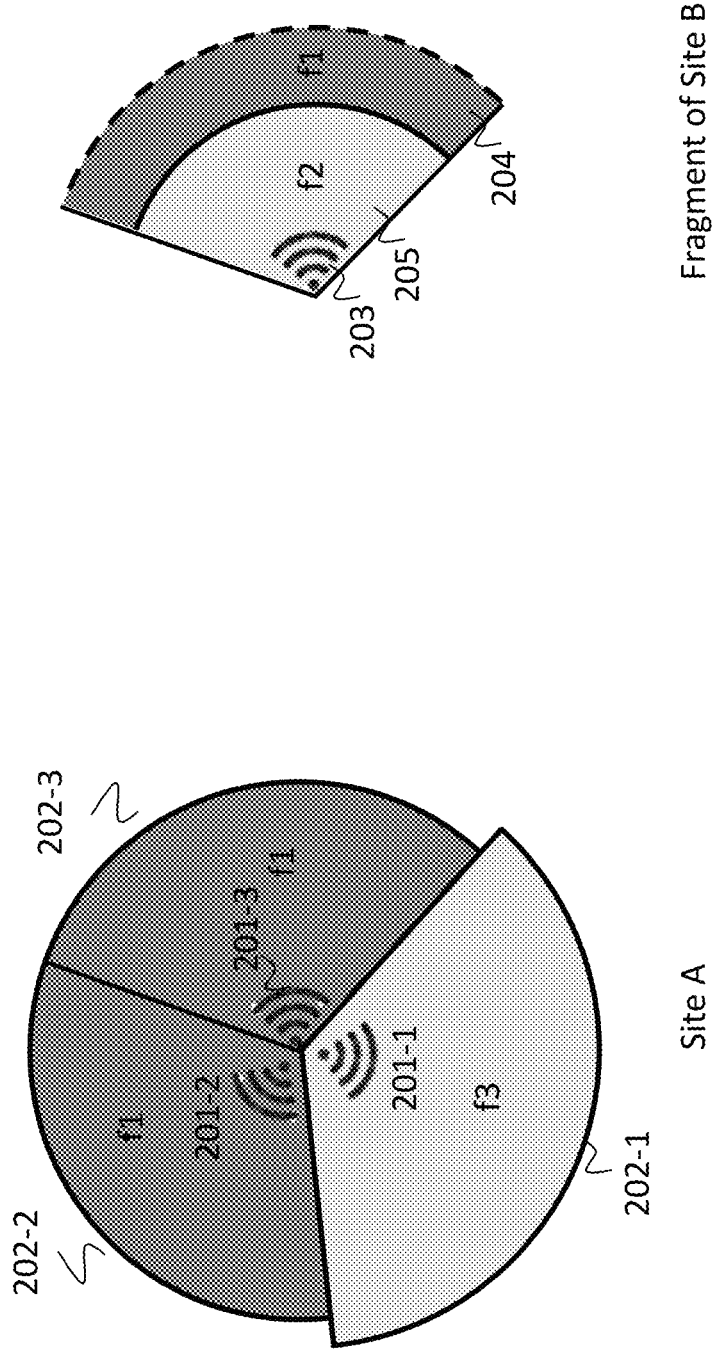
FIG. 2 illustrates generalized diagrams of exemplified sites in a cellular network.

Referring to FIG. 2, there is illustrated a generalized diagram of exemplified sites in a cellular network. A typical site in a cellular network comprises one or more access points connected to multiple directional antennas. Typically, directional antennas used in a cellular network are sector antennas having sector-shaped radiation patterns characterized by the direction that the antenna points to (this direction is referred to hereinafter as azimuth). The word "sector" is used herein in the geometric sense. The illustrated, exemplified Site A has a single access point (not shown) connected to three sector antennas denoted 201-1-201-3. Antenna 201-1 radiates with frequency f3 and covers a sector 202-1, and antennas 201-2 and 201-3 radiate with frequency f1, and cover, respectively, sectors 202-2 and 202-3. Thus, in the illustrated example, the antennas have equal angular widths (each antenna covers 120° sector) while radiated frequencies and the coverage area can be different.

A site of a cellular network can be further characterized by cells. Unless specifically stated otherwise, throughout the specification the term "cell" refers to logical objects defined as a combination of a carrier on a sector. Accordingly, a given cell can be defined by an operating frequency and an azimuth of a respective antenna. As in the exemplified Site A each sector antenna operates in a single band, and each sector 202-1-202-3 is associated with a single cell corresponding thereto.

In the illustrated fragment of an exemplified Site B, sector antenna 203 operates in two bands with operating frequencies f1 and f2 respectively. Such an antenna can be connected to two access points sharing the same antenna or to a single access point (e.g. enodeB) configured to support multiple carriers on multiple sectors. Thus, antenna 203 radiates to two overlapping cells 204 and 205 defined by substantially the same azimuth, but by different carriers. Cell 204 is defined by frequency f1 and cell 205 is defined by frequency f2. Cell 204 and cell 205 share the same antenna and their coverage depend on the same antenna tilt. By way of non-limiting example this common tilt cam be managed by the same remote tilt controller. As the cells with different bands may require different desired coverage, optimizing the parameters of the shared antenna in one band may cause coverage problem in another band. For example, optimizing a tilt of antenna 203 according to f1 band may result in under-shooting of operating in f2 band; while optimizing the tilt of antenna 203 according to requirements of f2 band may result in over-shooting operating in f1 band.

Figure 3:
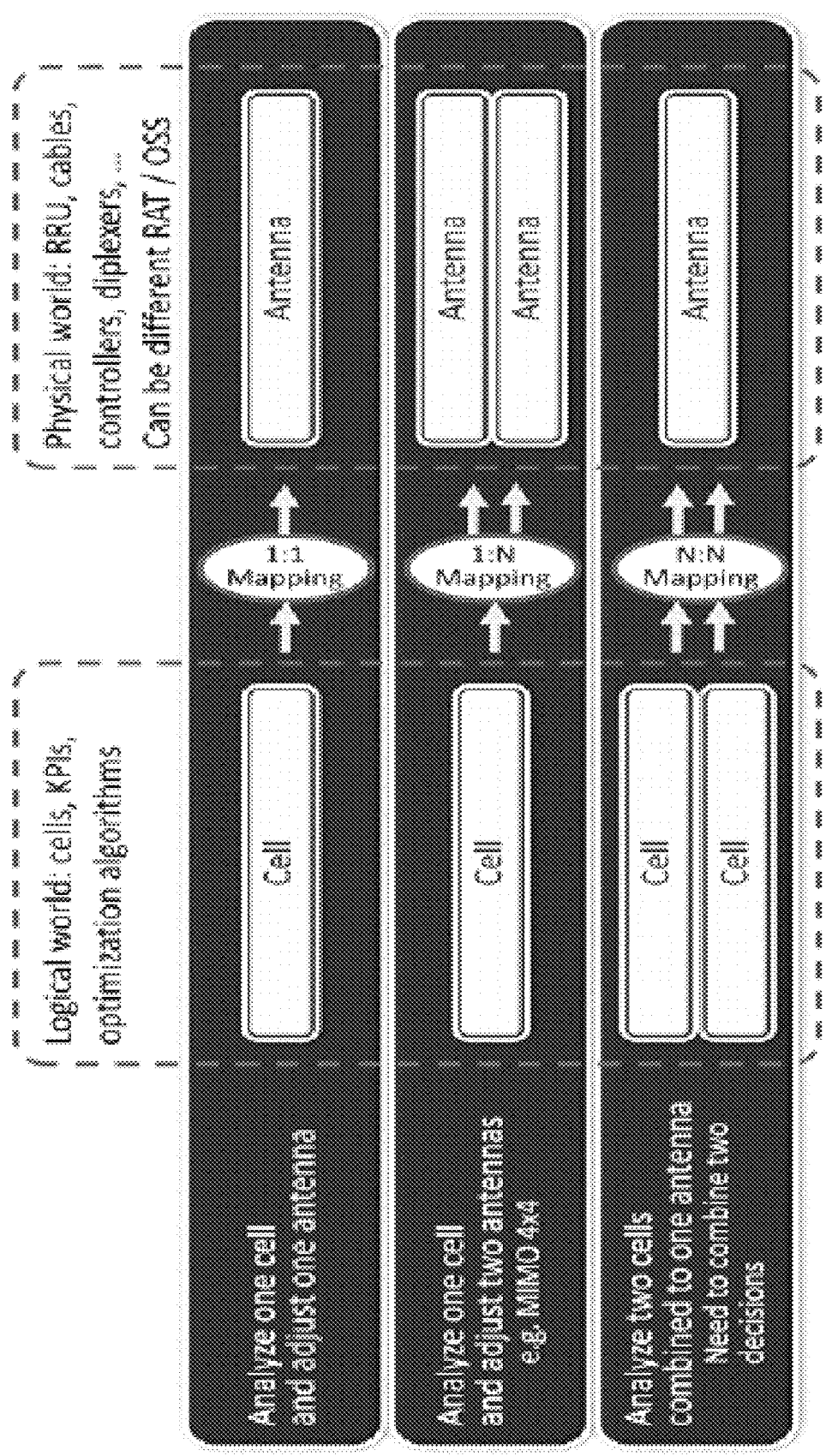
FIG. 3 illustrates a non-limiting example of mapping between logical and physical objects in the cellular network.

Referring to FIG. 3, there is illustrated a non-limiting example of mapping between logical objects (e.g. cells, KPIs, optimization algorithms) and physical objects (e.g.

APs, RRU, cables, controllers, etc.) in the cellular network. As illustrated, depending on the planned network topology, the mapping can be provided in 1:1 manner (e.g. one cell to one antenna), 1:N manner (e.g. one cell to several antennas), N:1 manner (several cells to one antenna) or N:N manner (several cells to several antennas).

The SON system can be further configured to use the mapping results and performance-related data to generate a continuously updated common (vendor-agnostic) information model informative of the network performance (including resource utilization and UEs' distribution) with regard to the logical objects. Generating the common information model can include normalizing measurement data (e.g. Timing Advance (TA), uplink Received Signal Strength Indicator (RSSI) on Physical Uplink Shared Channel (PUSCH), and Inter-frequency Handover Attempts, etc.) obtained from physical resources provided by different vendors.

Figure 4:
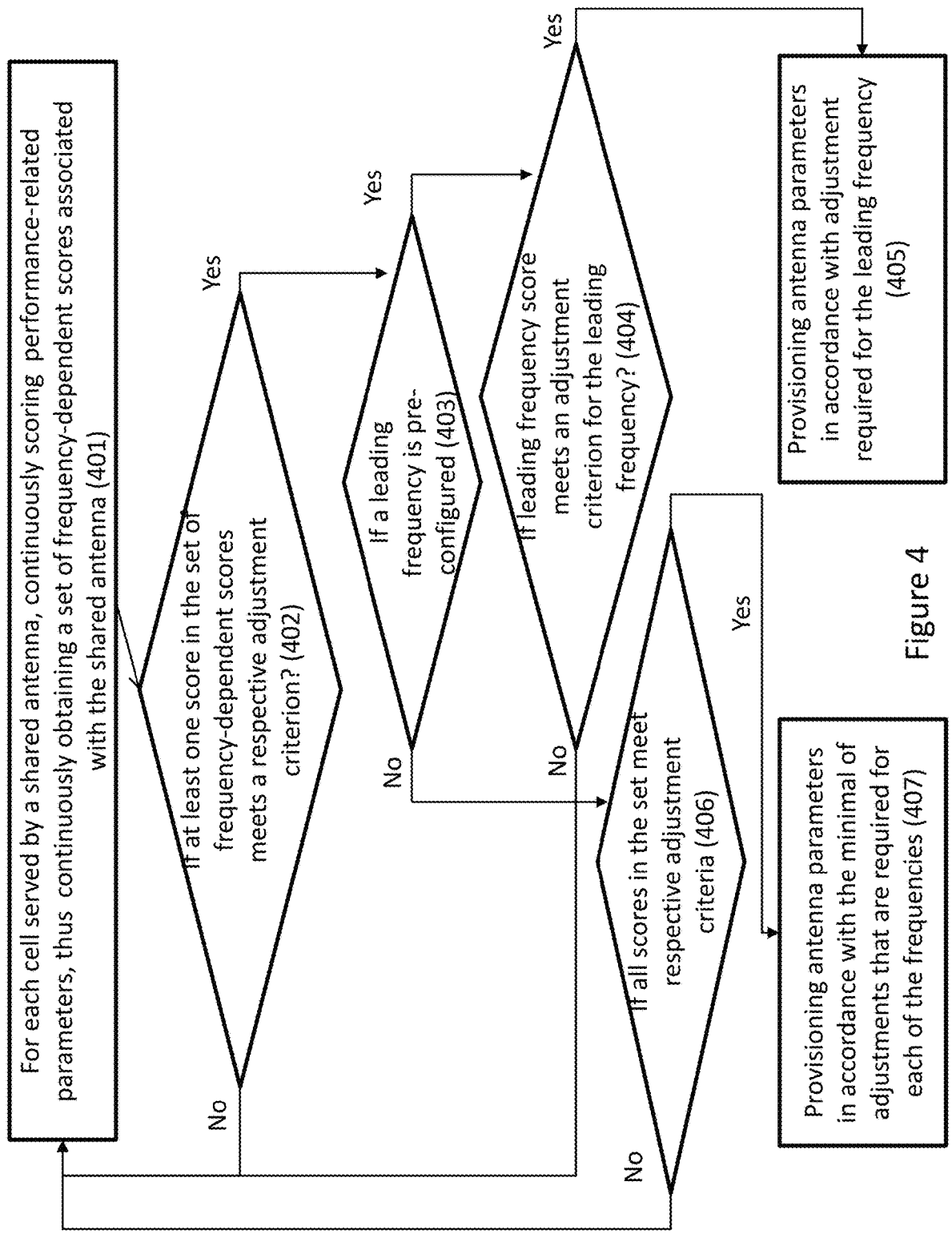
FIG. 4 illustrates a generalized flow diagram of managing shared antenna in accordance with certain embodiments of the presently disclosed subject matter.

FIG. 4 illustrates a generalized flow chart of managing, in accordance with certain embodiments of the presently disclosed subject matter, an antenna shared by at least two cells characterized by substantially the same azimuth and operating in different frequencies. Optionally, the SON system can be configured so that in a default mode all bands of a certain site (or sector) are considered as equally important. Furthermore, the SON system can enable a network operator to select a leading frequency (per network, site(s) or sector (s)), thereby to define a band having preferences for provisioning. For example, configuring a leading frequency is required during a rollout of an additional carrier, in a case of a partial coverage, in a case of clear priority of one of the frequencies (e.g. LTE over HSDPA), and alike. The SON system continuously processes the obtained performance-related data to obtain, for each cell served by the given shared antenna, a performance score. Thereby the SON system continuously obtains (401) a set of frequency-dependent scores associated with the given shared antenna and checks (402) if at least one score of said set of frequency-dependent scores meets a respective adjustment criteria. An adjustment criterion for a given cell is indicative that an antenna's parameters are required to be adjusted in order to meet performance requirements related to the given cell. It is noted that adjustment criteria can differ for different cells (i.e. different frequencies) served by the given shared antenna.

The performance score depends on the planned network topology, including cell locations and antenna azimuth. By way of non-limiting example, the performance score can be indicative of discrepancy between the coverage area corresponding to obtained RAN-related data and the coverage area corresponding to the planned network topology.

By way of non-limiting example, the performance score for a given frequency (i.e. cell) can be calculated as a value of a weighted combination of one or more KPIs depending on antenna parameters and network topology and characterizing the given band, and the adjustment criterion can be met if the respective value is less than a threshold. Optionally, the score can be calculated as a vector defined by values of such KPIs, and the adjustment criterion can be met if at least one of these values (or, alternatively, all values) is less than a respective threshold. The value of the threshold of a given cell can be predefined by an operator. Optionally, during operation, the SON system can change, in accordance with predefined rules, the value of the threshold responsive to network conditions (e.g. load conditions in a certain group of cells, load conditions in the entire network or a respective part thereof, changes of a privilege level of the given cell and/or site, certain situations (as e.g. the occurrence of special, optionally scheduled events, time of day, emergency situations, and so on, etc.) and/or optimization requirements.

Alternatively, the performance score can be calculated using the information model generated by the SON system with regard to the cells as detailed with reference to FIG. 3.

Figure 5A:
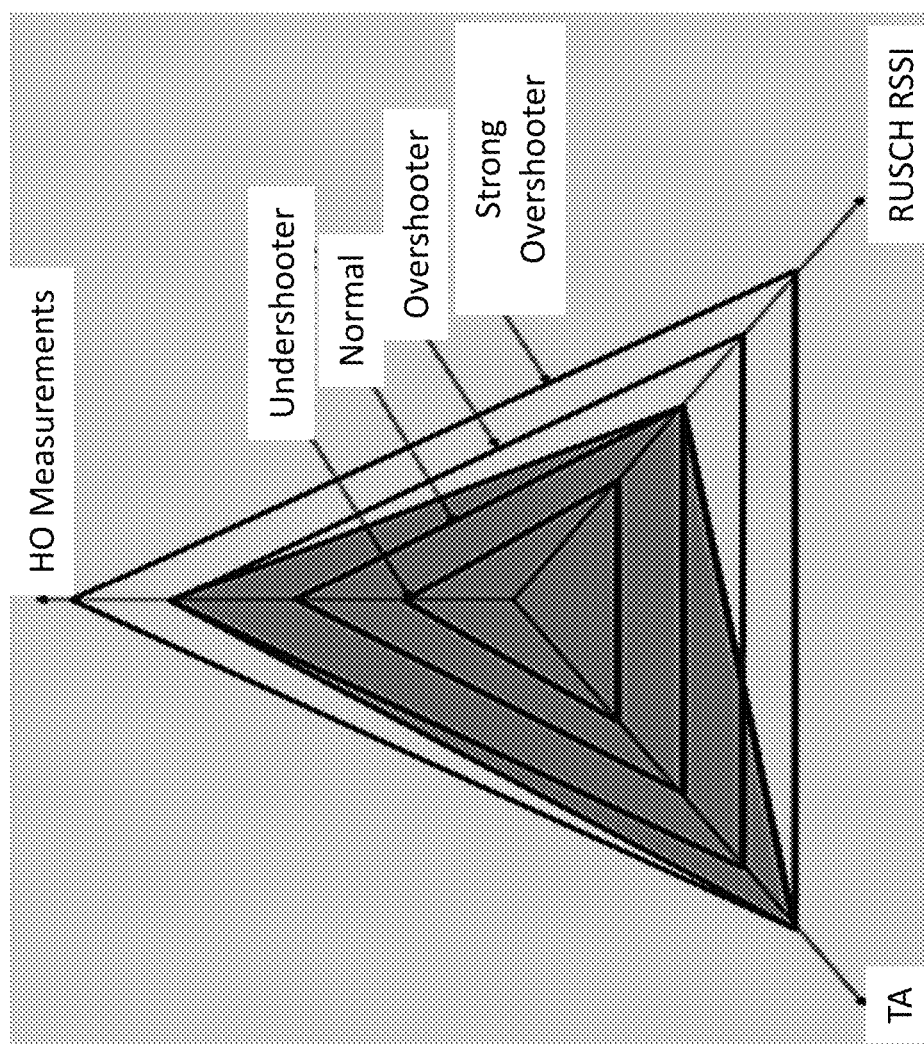
FIG. 5a and FIG. 5b illustrates a generalized information model usable for performance scoring accordance with certain embodiments of the presently disclosed subject matter.

For example, the information model can be used to calculate the performance score as a combination (optionally, weighted) of at least two of three independent sub-scores: a TA sub-score resulted from per cell Target Distance Analysis (e.g. indicative of percentage of traffic in significant and in abnormal zones); a PUSCH sub-score indicative of per cell PUSCH RSSI levels and a HO sub-score indicative of the amount of total handover attempts in a given cell. For example, as illustrated in FIG. 5*a*, scoring can be based on three dimensions (HO, TA and PUSCH RSSI), while each dimension is analyzed and scored separately. A cell with a low score is classified as an under-shooter, while a cell with a high score is classified as an over-shooter. By way of non-limiting example, an adjustment criterion can be met when the calculated total score is out of the normal zone illustrated in FIG. 5*b*. Alternatively, any one single sub-score of these sub-scores can be used as a performance score.

Figure 5B:
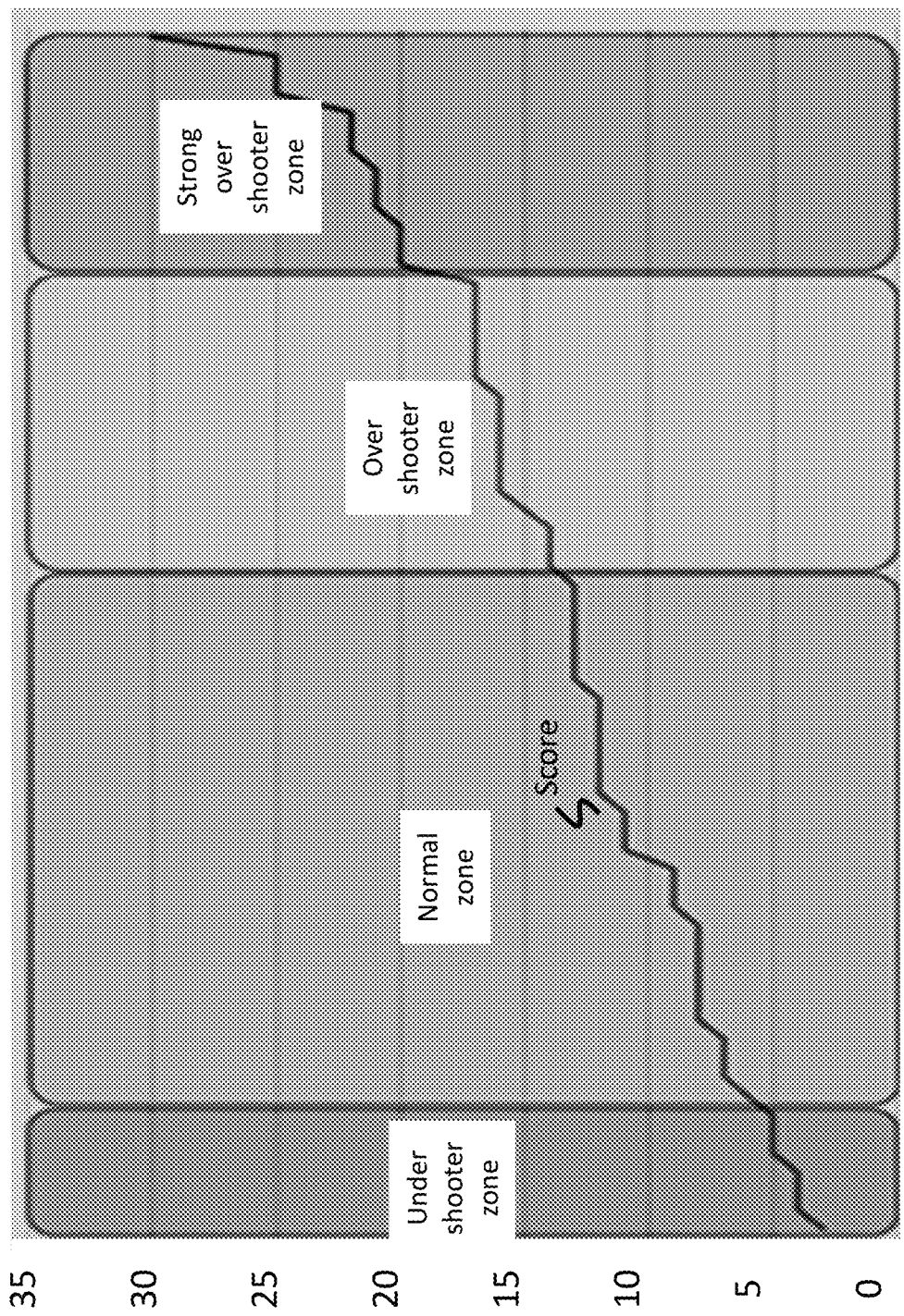

It is noted that, for purpose of illustration only, the above information model in FIGS. 5*a* and 5*b* is illustrated for an LTE network. Those skilled in the art will readily appreciate that similar information models can be generated by the SON system for other network types.

By way of another non-limiting example, alternatively or additionally, the information model and the respective scores can be based on DTM (digital topographic map) data.

Referring back to FIG. 4, when at least one score of said set of frequency-dependent scores meets a respective adjustment criteria, the SON system checks (403) if there is a leading frequency pre-configured for the given shared antenna. If Yes, and if a score of the pre-configured leading frequency meets (404) the adjustment criterion for the leading frequency, the SON system enables provisioning (405) antenna parameters (e.g. adjusting RET, RAS, RAB, power, and/or logical beam parameters) in accordance with adjustment(s) required for this leading frequency. If there is the pre-configured leading frequency, but its score does not meet the respective adjustment criteria, SON does not initiate any provisioning actions with regard to the given antenna. It is noted that in the case of leading frequency, the adjustments for non-leading frequency(s) are ignored, even if required.

If no leading frequency is pre-configured for the given shared antenna, the SON system operates in a "safe mode" with no preference for any frequency.

When there is no pre-configured leading frequency, the SON system checks (406) if all scores in the set of frequency-dependent scores associated with the shared antenna meet respective adjustment criteria. If Yes, the SON system enables (407) provisioning antenna parameters (e.g. adjusting RET, RAS, RAB, power, and/or logical beam parameters) in accordance with the minimal adjustment of the adjustments that are required for each one of the frequencies. By way of non-limiting example, when for one of two APs sharing the common antenna, the tilt needs to be adjusted from 3° degrees to 5°, and for the other one of two APs sharing the common antenna, the tilt needs to be adjusted from 3° degrees to 6°, the adjustment will result in 5°.

If at least one score in the set of frequency-dependent scores does not meet an adjustment criterion for respective frequency, the SON system does not initiate any provisioning actions with regard to the given antenna.

Optionally, adjustment criteria and provisioning actions can be differently configured for uplink and downlink. Optionally, operations 401-407 can be provided independently for uplink and downlink.

Operations 402-407 can be repeated with a frequency defined by a network operator (e.g. on a daily basis).

Operations 404 and 406 can be provided in an open loop mode upon approval of a network operator's specialists. Alternatively, operations 404 and 406 can be provided in a closed loop mode, with no need of human involvement.

Optionally, the SON system can further perform a two-phase validation: short term assessment (typically set up to run two hours after provisioning) and long-term assessment (typically set up to run 24 hours after provisioning). In case the validation fails, the system automatically rolls back the antenna adjustment action. The SON system can take the validation decision by reviewing KPIs (e.g. Cell Payload, User throughput, RSSI, HSPA drops, HO factor, etc.) of the respective cells sharing the antenna, as well as of the immediate surrounding cells (e.g. co-located APs and most dominant neighbors).

Figure 6:
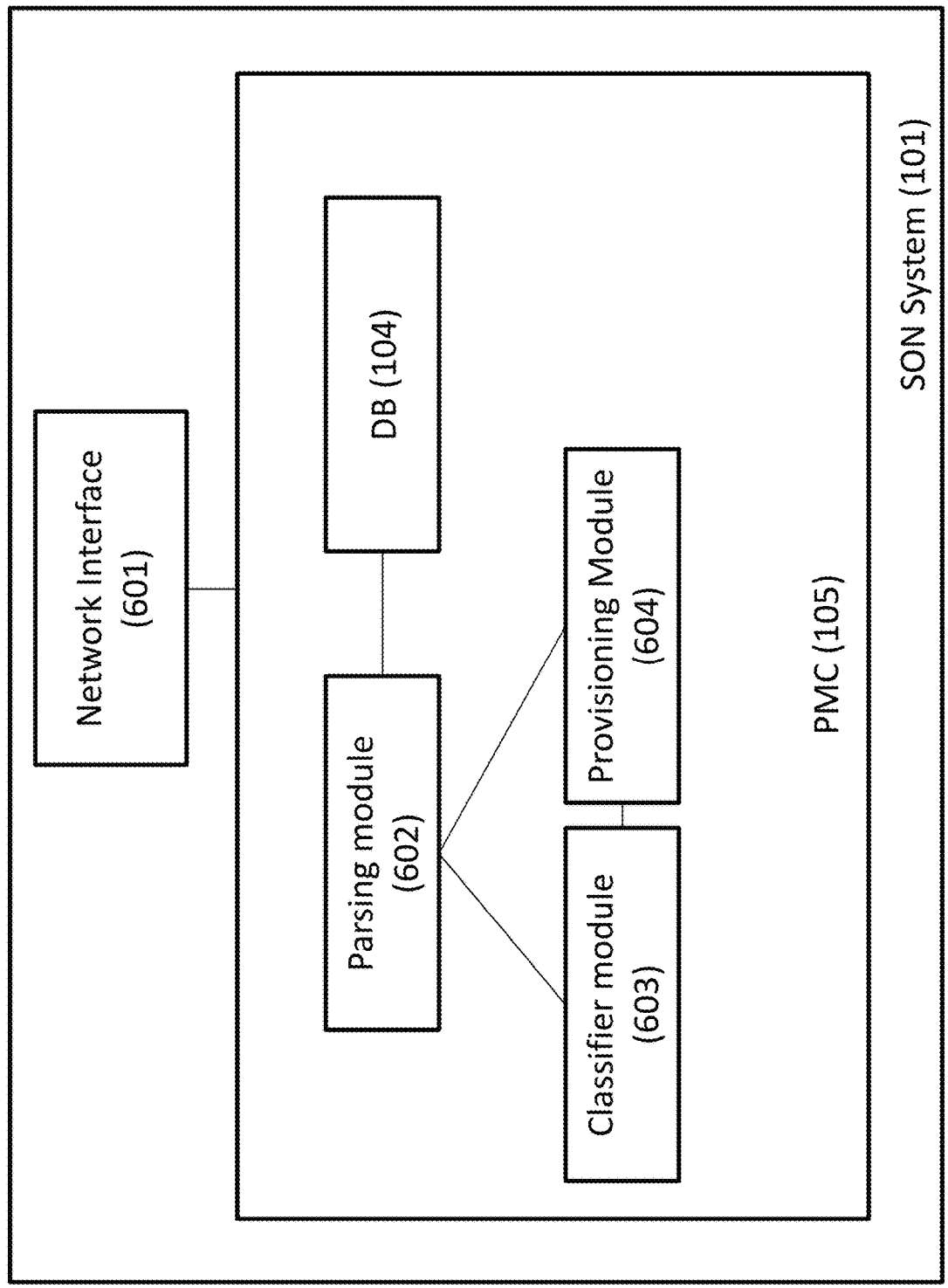
FIG. 6 illustrates a generalized block diagram of the SON system in accordance with certain embodiments of the presently disclosed subject matter.

Referring to FIG. 6, there is illustrated a generalized functional diagram of a SON system in accordance with certain embodiments of the presently disclosed subject matter. SON system (101) can be implemented as a standalone platform or integrated, fully or partly, with other network entities (e.g. OSS, PCRF, etc.). The SON system comprises a processor (105) operatively coupled to an interface circuit (601) (e.g. one or more ports). The interface circuit (601) is configured to continuously receive from ND depositories and/or other sources network data, and to forward the received data and/or derivatives thereof to the processor 105 and/or database 104 operatively coupled to the processor. The interface circuit can be further configured to continuously receive KPIs or other performance-related data. Likewise, interface circuit can be further configured to receive data informative of the planned network topology. The processor 105 is configured to provide necessary processing of the received data in accordance with operations detailed with reference to FIGS. 1-5. Memory 605 operatively coupled to the processor 105 is configured to accommodate all thresholds, criteria and predefined rules and information models detailed with reference to FIGS. 1-5.

The processor (105) can be configured to execute several functional modules in accordance with computer-readable instructions implemented on a non-transitory computer usable medium. Such functional modules are referred to hereinafter as comprised in the processor.

In accordance with certain embodiments of the presently disclosed subject matter, the processor can comprise operatively coupled parsing module 602, classifier module 603 and provisioning module 604. The parsing module 602 can be configured to process the received network data to derive data indicative of resource utilization status or other performance related data from the log records accommodated in the database 104. The classifier module 603 can be configured to continuously assess performance conditions (e.g. scores in accordance with dynamically updated information model as detailed with reference to FIGS. 1-5) and forward the results of classification to the provisioning module 604 and/or to the memory 605. The provisioning module 604 is configured to generate provisioning scripts (or select pre-provisioned scripts) in accordance with the classification results and provide them to the respective OSS for further execution. Optionally, the provisioning module can be configured to send an execution command for initiating the provisioning scripts. Such commands can be dispatched to the appropriate OSS handler and translated to the respective CLI or provisioning plan.

Those skilled in the art will readily appreciate that the presently disclosed subject matter is not bound by the configuration of FIG. 6; equivalent and/or modified functionality can be consolidated or divided in another manner and can be implemented in any appropriate combination of software with firmware and/or hardware.

It is to be understood that the presently disclosed subject matter is not limited in its application to the details set forth in the description contained herein or illustrated in the drawings. The presently disclosed subject matter is capable of other embodiments and of being practiced and carried out in various ways.

It will also be understood that the presently disclosed subject matter further contemplates a non-transitory machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of managing a cellular network comprising at least one site characterized by a plurality of cells sharing a common antenna and operating in different frequencies, the method comprising:

continuously obtaining by a computerized system performance-related data with regard to each cell of the plurality of cells and network topology-related data indicative, at least, of location and azimuth of the shared antenna;

processing, by the computerized system, the obtained performance-related data and network topology-related data to obtain, for each cell of the plurality of cells, a performance score, thus giving rise to a set of frequency-dependent scores associated with the shared antenna; and enabling, by the computerized system, provisioning of the shared antenna in accordance with the set of frequency-dependent scores associated with the shared antenna, wherein: when no leading frequency is configured for the shared antenna, the provisioning is enabled when each score in the set of frequency-dependent scores meets a respective adjustment criterion; and when a frequency among the different frequencies is configured as a leading frequency, the provisioning is enabled when a score corresponding to the leading frequency meets the respective adjustment criterion for the leading frequency.

2. The method of claim 1, wherein the performance score of a given cell is calculated as a value of a weighted combination of one or more Key Performance Indicators (KPIs) depending on parameters of the shared antenna and characterizing the given cell, and wherein the adjustment criterion is met when the calculated value is less than a threshold.

3. The method of claim 1, wherein the performance score of a given cell is calculated as a set of values of Key Performance Indicators (KPIs) depending on parameters of the shared antenna and characterizing the given cell, and wherein the adjustment criterion is met when at least one of the values is less than a threshold.

4. The method of claim 1, wherein the performance score of a given cell is calculated as a value corresponding to at least one sub-score selected from a group comprising a sub-score resulting from target distance analyses for the given cell, a sub-score resulting from measurements of Physical Uplink Shared Channel (PUSCH) Received Signal Strength Indicator (RSSI) levels related to the given cell and a sub-score resulting from amount of total handover attempts in the given cell.

5. The method of claim 1, wherein the performance score of a given cell is calculated as a value corresponding to a combination of at least two independent sub-scores selected from a group comprising a sub-score resulting from target distance analyses for the given cell, a sub-score resulting from measurements of Physical Uplink Shared Channel (PUSCH) Received Signal Strength Indicator (RSSI) levels related to the given cell, and a sub-score resulting from amount of total handover attempts in the given cell.

6. The method of claim 1, wherein the performance score of a given cell is indicative of a discrepancy between a coverage area corresponding to the obtained performance-related data and a coverage area corresponding to the obtained network topology-related data.

7. The method of claim 1, wherein in absence of the leading frequency, the provisioning is enabled in accordance with a minimal adjustment of adjustments that are required for each one of the frequencies.

8. The method of claim 1, wherein the plurality of cells is served by a plurality of Access Points (APs) sharing the common antenna and operating in the different frequencies.

9. The method of claim 1, wherein provisioning of the shared antenna comprises at least one of adjusting remote azimuth steering/horizontal (RAS), adjusting remote electrical tilt/vertical adjustment (RET) and adjusting Remote Azimuth Beam-width (RAB).

10. A computerized system usable to manage a cellular network comprising at least one site characterized by a plurality of cells sharing a common antenna and operating in different frequencies, the system comprising
a processing and memory circuitry (PMC) operatively connected to an input interface,
wherein: the input interface is configured to continuously receive performance-related data with regard to each cell of the plurality of cells and network topology-related data indicative, at least, of location and azimuth of the shared antenna; and
the PMC is configured to:
process the obtained performance-related data and network topology-related data to obtain, for each cell of the plurality of cells, a performance score, thus giving rise to a set of frequency-dependent scores associated with the shared antenna; and
enable provisioning of the shared antenna in accordance with the set of frequency-dependent scores associated with the shared antenna,
wherein:
when no leading frequency is configured for the shared antenna, the provisioning is enabled when each score in the set of frequency-dependent scores meets a respective adjustment criterion; and
when a frequency among the different frequencies is configured as a leading frequency, the provisioning is enabled when a score corresponding to the leading frequency meets the respective adjustment criterion for the leading frequency.

11. The system of claim 10, wherein the PMC is configured to calculate the performance score of a given cell as a value of a weighted combination of one or more KPIs depending on parameters of the shared antenna and characterizing the given cell, and wherein the adjustment criterion is met when the calculated value is less than a threshold.

12. The system of claim 10, wherein the PMC is configured to calculate the performance score of a given cell as a set of values of Key Performance Indicators (KPIs) depending on parameters of the shared antenna and characterizing the given cell, and wherein the adjustment criterion is met when at least one of the values is less than a threshold.

13. The system of claim 10, wherein the PMC is configured to calculate the performance score of a given cell as a value corresponding to at least one sub-score selected from the group comprising a sub-score resulting from target distance analyses for the given cell, a sub-score resulting from measurements of Physical Uplink Shared Channel (PUSCH) Received Signal Strength Indicator (RSSI) levels related to the given cell, and a sub-score resulting from amount of total handover attempts in the given cell.

14. The system of claim 10, wherein the PMC is configured to calculate the performance score of a given cell as a value corresponding to a combination of at least two independent sub-scores selected from the group comprising a sub-score resulting from target distance analyses for the given cell, a sub-score resulting from measurements of Physical Uplink Shared Channel (PUSCH) Received Signal Strength Indicator (RSSI) levels related to the given cell, and a sub-score resulting from amount of total handover attempts in the given cell.

15. The system of claim 10, wherein in absence of the leading frequency, the provisioning is enabled in accordance with a minimal adjustment of adjustments that are required for each one of the frequencies.

16. The system of claim 10, wherein the plurality of cells is served by a plurality of Access Points (APs) sharing the common antenna and operating in the different frequencies.

17. The system of claim 10, wherein provisioning of the shared antenna comprises at least one of adjusting remote azimuth steering/horizontal (RAS), adjusting remote electrical tilt/vertical adjustment (RET) and adjusting Remote Azimuth Beam-width (RAB).

18. A non-transitory computer readable medium comprising instructions that, when executed by a computer, cause the computer to perform controlling traffic in a cellular network comprising at least one size characterized by a plurality of cells sharing a common antenna and operating in different frequencies, the controlling traffic comprising:
continuously obtaining performance-related data with regard to each cell of the plurality of cells and network topology-related data indicative, at least, of location and azimuth of the shared antenna;
processing the obtained performance-related data and network topology-related data to obtain, for each given cell of the plurality of cells, a performance score, thus giving rise to a set of frequency-dependent scores associated with the shared antenna; and
enabling provisioning of the shared antenna in accordance with the set of frequency-dependent scores associated with the shared antenna,
wherein:
when no leading frequency is configured for the shared antenna, the provisioning is enabled when each score in the set of frequency-dependent scores meets a respective adjustment criterion; and
when a frequency among the different frequencies is configured as a leading frequency, the provisioning is enabled when a score corresponding to the leading frequency meets the respective adjustment criterion for the leading frequency.

\* \* \* \* \*